US011593080B1

(12) United States Patent
Zannier et al.

(10) Patent No.: US 11,593,080 B1
(45) Date of Patent: Feb. 28, 2023

(54) ELIMINATING DEAD STORES (71) Applicant: International Business Machines Corporation, Armonk, NY (US)

(72) Inventors: Jordan Ryan Zannier, Scarborough (CA); Reid Copeland, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/644,813

(22) Filed: Dec. 17, 2021

(51) Int. Cl.
G06F 8/41 (2018.01)

(52) U.S. Cl.
CPC ............ G06F 8/4435 (2013.01); G06F 8/433 (2013.01)

(58) Field of Classification Search
None
See application file for complete search history.

(56) References Cited

U.S. PATENT DOCUMENTS

| | | | | |
|---|---|---|---|---|
| 5,923,883 | A * | 7/1999 | Tanaka | G06F 8/443 |
| | | | | 712/220 |
| 7,353,503 | B2 | 4/2008 | Nair | |
| 7,373,641 | B2 | 5/2008 | Ogasawara | |
| 7,543,284 | B2 * | 6/2009 | Bolton | G06F 8/4435 |
| | | | | 717/148 |
| 2005/0138029 | A1 * | 6/2005 | Blainey | G06F 8/433 |
| 2013/0061215 | A1 | 3/2013 | Sathyanathan | |
| 2016/0357965 | A1 * | 12/2016 | Prowell | G06F 21/566 |
| 2017/0060552 | A1 | 3/2017 | Perron | |
| 2017/0344349 | A1 | 11/2017 | He | |
| 2018/0373510 | A1 * | 12/2018 | Chung | G06F 8/4441 |
| 2020/0042216 | A1 * | 2/2020 | Zhang | G06N 3/105 |

FOREIGN PATENT DOCUMENTS

JP 2020067697 A 4/2020

OTHER PUBLICATIONS

IBM, "Transmittal Letter", Grace Period Disclosure, Dec. 15, 2021, 1 page.

* cited by examiner

*Primary Examiner* — Marina Lee
(74) *Attorney, Agent, or Firm* — Stephen R. Yoder (57) ABSTRACT

Dataflow optimization by dead store elimination focusing on logically dividing a contiguous storage area into different portions by use to allow a different number and type of dataflow and dead store techniques on each portion. A first storage portion, containing the storage for control flow related metadata, is split from a remaining storage portion. Liveness analysis is executed on the first storage portion using bitvectors with each bit representing four bytes. The remaining storage portion, containing the temporary storage for computational values, is processed using a deadness-range-based dataflow analysis. IN and OUT sets for each basic block are generated by processing blocks GEN and KILL sets by performing a backwards intersection dataflow analysis. Stores that write to the set of dead ranges in the IN sets of blocks are eliminated as dead stores.

18 Claims, 3 Drawing Sheets

ELIMINATING DEAD STORES

STATEMENT ON PRIOR DISCLOSURES BY AN INVENTOR

The following disclosure(s) are submitted under 35 U.S.C. 102(b)(1)(A) as prior disclosures by, or on behalf of, a sole inventor of the present application or a joint inventor of the present application:

(i) Grace Period Disclosure—Transmittal Letter, IBM, Dec. 15, 2021, 1 page.

BACKGROUND

The present invention relates generally to the field of dataflow optimization, and more particularly to efficient elimination of dead stores.

A variable that is assigned a value but is not read by any subsequent instruction may be referred to as a dead store. Dead stores tend to waste processor time and memory. Dead stores that are not removed can also prevent other optimizations from being effective. A dead store may be detected by of static program analysis. Dead store elimination is an optimization process performed by a compiler to eliminate dead stores. For example, if two stores to the same location have no intervening load, the first store is unnecessary, and is therefore removed by the optimizing compiler or binary translator (equivalently referred to herein afterwards as a binary optimizer).

A control-flow graph (CFG) is a representation, using graph notation, of all paths that might be traversed through a program during its execution. The CFG is essential to many compiler optimizations, binary optimizer transformations, and static-analysis tools. In a control-flow graph each node in the graph represents a basic block, i.e. a straight-line piece of code without any jumps or jump targets; jump targets start a block, and jumps end a block. Directed edges are used to represent jumps in the control flow. There are, in most representations, two specially designated blocks: the entry block, through which control enters into the flow graph, and the exit block, through which all control flow leaves.

Different programming languages offer different control flow constructs at the source level for the programmer to choose from. Common control flow constructs available in languages such as C/C++ and Java include syntax for loops such as for such as "while" loops, "do-while" loops and "for" loops amongst other choices, in addition to "go-to" syntax to cause direct jumps to particular locations in the source code. (Note: the term "JAVA" may be subject to trademark rights in various jurisdictions throughout the world and are used here only in reference to the products or services properly denominated by the marks to the extent that such trademark rights may exist.)

In the COBOL programming language, the primary control flow construct available at the source level is through the PERFORM keyword. A PERFORM statement in COBOL is a very flexible and general control flow construct that can be used to generate a variety of looping, go-to, and other control flow behaviors. To manage and track the various types of control flow possible with PERFORM the compiler creates and manages a set of metadata to track locations where PERFORM operations should branch to and return from. Because real-world COBOL programs can become very large and may contain many PERFORM statements, the control flow related metadata itself (the PERFORM infrastructure storage or slots) can become very large. Thus, using existing dataflow optimizations to remove unnecessary stores to the metadata in the compiled/translated program becomes a very time consuming and memory intensive operation.

Known approaches to dead store elimination use the dataflow concept of liveness where variables, or portions of variables, are tracked if they are "live," which means that no store or other operation has been found that definitely writes to the same location. The present invention introduces and uses a new concept called "deadness" that is the inverse of liveness. In deadness, variables, or portions of variables, are tracked if they are definitely not live, which means that some store or other operation has been found that definitely writes to the same location.

SUMMARY

In one aspect of the present invention, a method, a computer program product, and a system for dead store elimination of a program includes: determining where control flow related metadata is located in a contiguous storage area for compiler metadata; executing at least one store elimination pass on a first portion of the contiguous storage area ending at a last slot sequentially located last among slots for the control flow related metadata; creating two deadness contribution sets for each control flow block in a second portion of the contiguous storage area, the second portion being the remaining contiguous storage area after the last slot for the control flow related metadata; initializing two dataflow sets for each control flow block in the second portion of the contiguous storage area; executing at least one deadness-range-based dataflow analysis on the second portion to identify intervals of dead store ranges; and eliminating the identified intervals of dead store ranges of a program.

In another aspect of the present invention, a method, a computer program product, and a system for dead store elimination of a program includes, in addition to the operations above, processing intermediate representations of each control flow block with respect to the corresponding two deadness contribution sets. The two deadness contribution sets include a GEN set and a KILL set. The GEN set of each corresponding control flow block including writes to the second portion. The KILL set of each corresponding control flow block including reads of the second portion.

In yet another aspect of the present invention, a method, a computer program product, and a system for executing a deadness-range-based dataflow analysis includes calculating the two dataflow sets including an IN set and an OUT set for each control flow block, the IN set being calculated using set intersection on each of the OUT sets of the successor control flow blocks, and the OUT set being calculated by the formula OUT=(IN−KILL) U GEN.

DETAILED DESCRIPTION

A method for effective and efficient dead store elimination by splitting the contiguous storage area based on how it's used and then applying different dataflow optimization techniques to each area is described in this and the following sections. A first storage portion, that contains the PERFORM infrastructure slots, is split from a remaining portion of the contiguous storage area. A small number of passes is executed on the first storage portion using bitvectors with each bit representing four bytes. The remaining portion of the contiguous storage area can then be processed in a greater number of passes using a deadness-range-based dataflow analysis. For this dataflow, IN and OUT sets for each basic block are generated. The set of stores in each block to the dead ranges in the IN sets are eliminated as dead stores. The present invention may be a system, a method, and/or a computer program product. The computer program product may include a computer readable storage medium (or media) having computer readable program instructions thereon for causing a processor to carry out aspects of the present invention.

In one aspect of the present invention, a method, a computer program product, and a system for dead store elimination of a program includes: determining where PERFORM infrastructure slots are located in a contiguous storage area for the purpose of splitting this storage area into two contiguous portions; executing a store elimination pass on the first portion of the storage area; creating two deadness contribution sets for each control flow block in a second portion of the contiguous storage area, the second portion being the remaining storage area after the last PERFORM infrastructure slot; initializing two sets for each control flow block in the second portion of the contiguous storage area; executing a deadness-range-based dataflow analysis on this second portion to identify intervals of dead store ranges; and eliminating the identified intervals of dead store ranges of a program.

In another aspect of the present invention, logically dividing the contiguous storage area into multiple portions enables dead store elimination to be run multiple times on the second portion where such iteration is required to achieve effective dead store elimination for the types of stores to this second portion. The first portion requires fewer passes for effective dead store elimination. Not splitting would require all the passes to be run on the entire contiguous storage area. This causes slower dataflow optimization times and also reduced benefits as such iteration is not required for the first, and typically much larger, first portion of the contiguous storage area. Splitting in this way also provides flexibility in independently choosing a liveness or deadness-based dataflow for each portion. This ability to choose the type of dataflow per portion further increases the efficiency of the dataflow analysis and therefore also the dead store elimination optimization.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
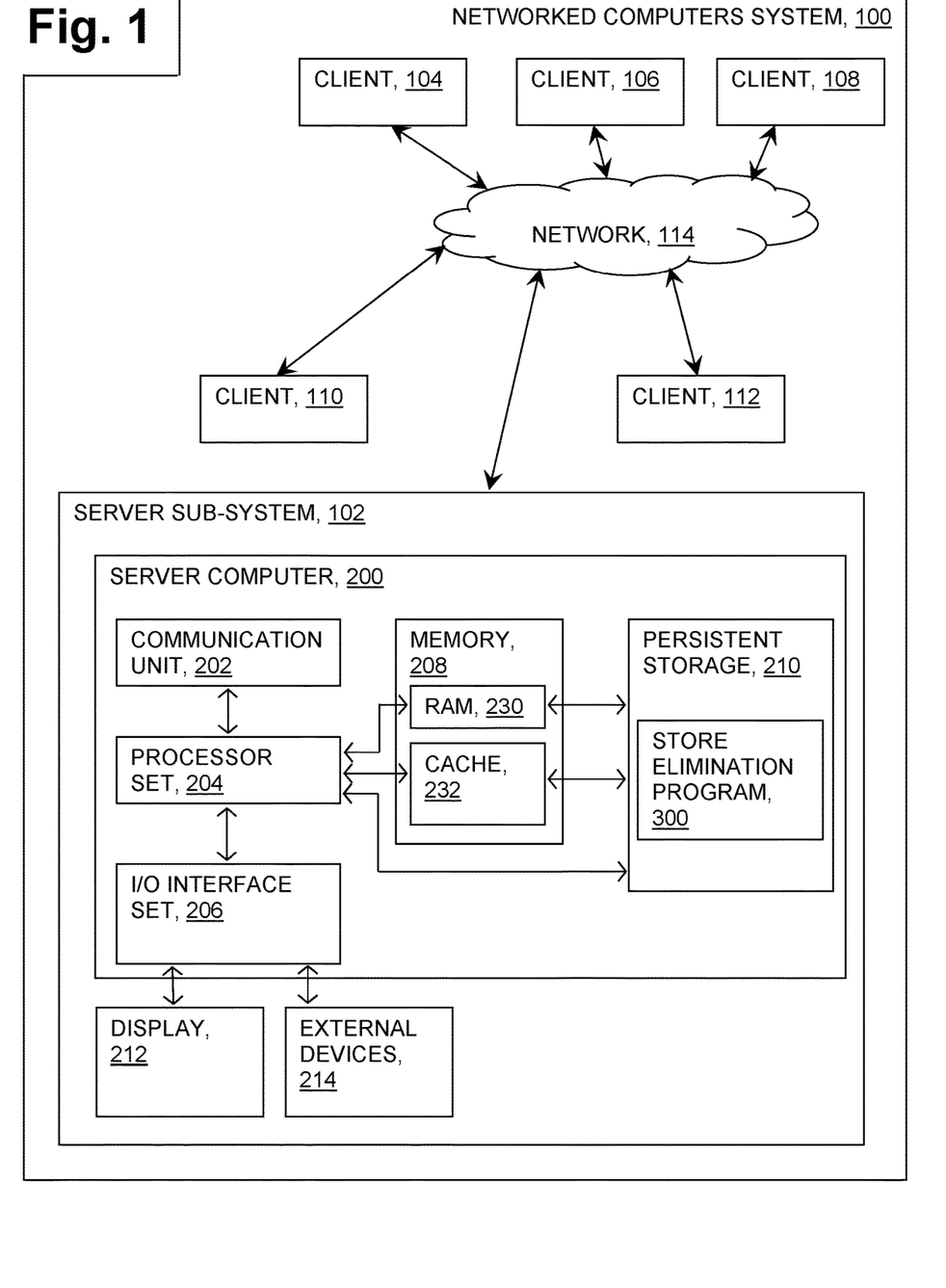
FIG. 1 is a schematic view of a first embodiment of a system according to the present invention.

The present invention will now be described in detail with reference to the Figures. FIG. 1 is a functional block diagram illustrating various portions of networked computers system 100, in accordance with one embodiment of the present invention, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and store elimination program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Store elimination program 300 operates to efficiently perform dead store elimination by splitting, or dividing, the contiguous storage area into two sub-areas, the PERFORM-related storage and the balance of the contiguous storage area referred to herein as the computational storage area. The PERFORM-related store portion is optimized with a single pass, or a relatively small number of passes, using bitvectors with each bit representing four bytes. The computational storage portion is optimized with a relatively greater number of multiple passes using a deadness-range-based dataflow analysis.

Some embodiments of the present invention recognize the following facts, potential problems and/or potential areas for improvement with respect to the current state of the art: (i) in many real-world programs and compiled modules, the contiguous storage area holds temporary computational results is a small fraction (sometimes five percent or less) of the overall contiguous storage area size that would benefit from dead store optimization; and/or (ii) real-world programs and compiled modules often contain many PERFORM statements (as it is the primary COBOL control flow construct) such that the PERFORM infrastructure requires substantial amount of storage to store program location addresses.

The distinction on the makeup of the contiguous storage area is key to achieving efficient and effective dead store elimination because splitting this contiguous storage area in this way allows for more passes to be run against the second, smaller portion where such iterations lead to more effectiveness. A fewer number of passes is needed for the larger, first portion. The splitting of the contiguous storage area also allows for flexibility in choosing different dataflow techniques of "liveness" or "deadness" for each portion. The splitting action further allows for customizing how fine grained each byte of memory needs to be tracked for efficient dataflow and effective dead store removal.

As the term is used herein, a single pass during dataflow analysis refers to execution of the dataflow until a fixed point is reached, this occurs when the computation of the OUT sets of all the control flow blocks in the program no longer change. The results of the dataflow analysis are then used to eliminate dead stores.

A dataflow analysis pass is executed on the PERFORM-related portion of the contiguous storage area. This analysis requires only operating on stores to the storage area locations up to the end of the last PERFORM related slot. This pass only needs to use one bit for every four bytes of memory as all the stores up to this point in this layout are addresses and only read/written in four-byte sizes. This dataflow analysis pass and the dead store elimination optimization that uses this analysis may be repeated, if necessary, on this portion of the storage area. In a typical embodiment a first pass can eliminate most of the PERFORM related stores that can be eliminated, but some programs may require an additional pass for the remaining stores that can be eliminated.

A second dataflow analysis then addresses the remaining storage area by tracking deadness and intervals of deadness within the second portion of the contiguous storage area that contains the storage used for computational stores. As the computational storage area is both heavily reused and used in complex ways to store intermediate computations it typically takes several passes, interspersed with other optimizations, to be able to fully remove all the stores that can be eliminated from this portion.

When tracking deadness, less information and data is processed than if liveness, live bytes, were tracked. Intermediate representations (IR) may be processed as illustrated in Table 1, below, to create the information per control-flow graph block for deadness analysis.

TABLE 1

Example Basic Block of a Control-Flow Graph.

| Intermediate Rep (IR) | ACTION TAKEN | GEN SET | KILL SET |
|---|---|---|---|
| Store TempArea, Location 100, Length 4 | Create info in GEN set of loc. 100, len. 4 | {loc 100, len 4} | { } |
| Store TempArea, Location 104, Length 4 | See info in GEN set with loc. 100, len. 4, turn this info into loc. 100, len. 8 | {loc 100, len 8} | { } |
| Load TempArea, Location 108, Length 8 | Create info in KILL set of loc. 108, len. 8 | {loc 100, len 8} | {loc 108, len 8} |
| Store TempArea, Location 112, Length 10 | See that range 112-116 is already in KIL set, no update to GEN for that range, but create info in GEN set with loc. 116, len. 6 | {loc 100, len 8}, {loc 116, len 6} | {loc 108, len 8} |

There are two sets to represent the contribution of each control flow block to the deadness of the computational store portion of the contiguous storage area. The two sets are referred to as the GEN set and the KILL set. Each set is a set of ranges mapping bytes of the contiguous storage area. The GEN set is the set of ranges that are newly dead from the control flow block and the KILL set is the set of ranges that are no longer dead from the control flow block. Writes to the computational store portion of the contiguous storage area are processed as contributions to the GEN set. Reads of the computational store portion of the contiguous storage area are processed as contributions to the KILL set.

Referring to Table 1, above, the intermediate representation in the basic block is processed in order. Stores, loads, and calls are handled by updating the GEN and KILL sets to take them into account. In deadness, stores cause updates to the GEN set and loads cause updates to KILL set, the opposite of a liveness analysis. It should be noted that stores can only update the GEN set if the corresponding range is not already in the KILL set.

Having processed all the IR to create the GEN and KILL sets for each basic block, the two sets to be used in execution of the dataflow analysis are initialized, specifically, the IN and OUT sets of each basic block. The IN and OUT sets are initialized to contain a single range for the entire computational store portion of the contiguous storage area. At this point, the deadness-range-based dataflow analysis may proceed.

The results of the deadness-range-based dataflow analysis are used for eliminating dead stores that are in the set of dead ranges in the IN set.

Figure 2:
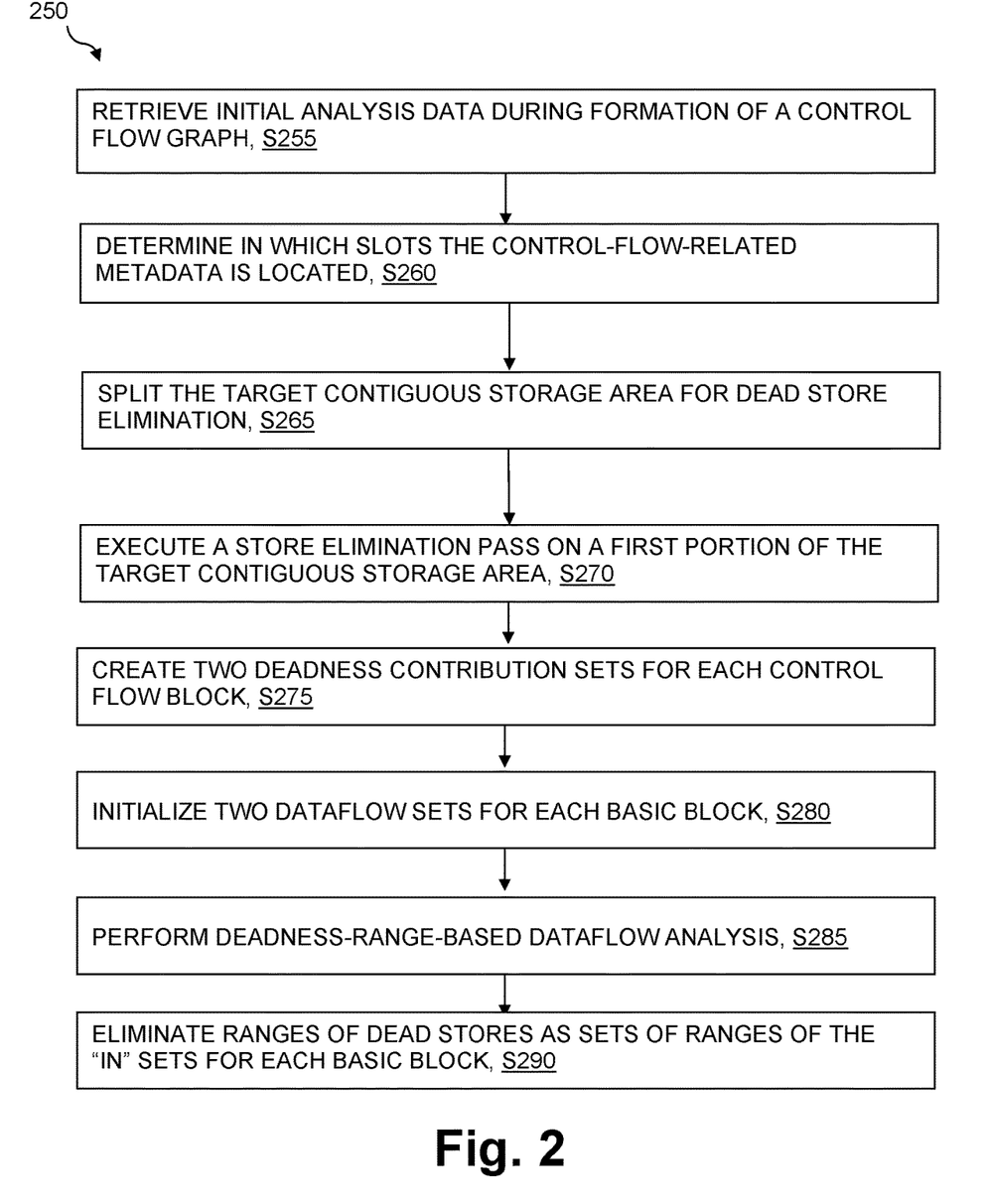
FIG. 2 is a flowchart showing a method performed, at least in part, by the first embodiment system.
Figure 3:
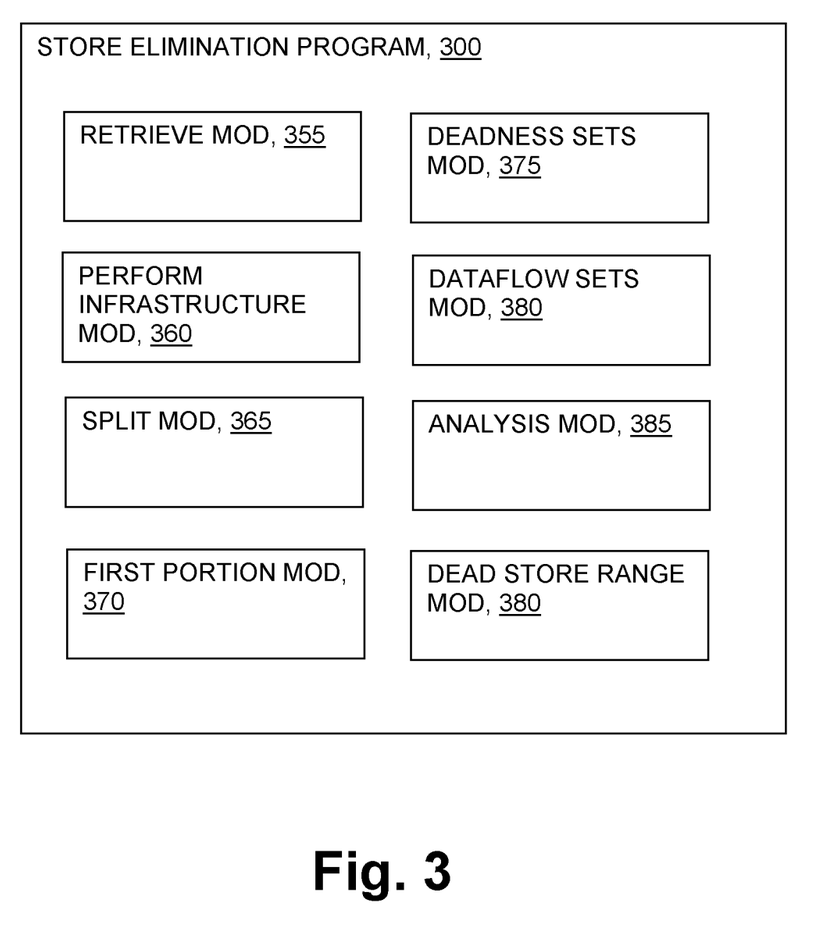
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where retrieve module ("mod") 355 retrieves initial analysis data gathered during formation of the control flow graphs of the original binary code for the program in question. Some of the data gathered includes identification where the storage for the PERFORM infrastructure related slots are located. By leveraging earlier-collected information on the layout of the contiguous storage area to identify the most used and reused portions of this storage, such as those that are used to hold temporary arithmetic results, the less used areas can be separated from the more used with varying degrees of processing. The most used storage areas are often quite smaller than the less-used areas. As described below, the less used PERFORM infrastructure areas are processed by a single dead store pass, or at least a relatively small number of dead store passes, while a more in-depth approach with a relatively greater number of passes is applied to the smaller but more heavily used computational storage area.

Processing proceeds to step S260, where PERFORM infrastructure mod 360 determines where PERFORM slots are located. The contiguous storage area layout used by some COBOL compilers indicates that the PERFORM related slots always end before the portion that holds computational storage area begins. This boundary is where the contiguous storage area will be split in the following step. It should be noted that embodiments of the present invention apply equally to compilers (compiling from a high-level source code, such as a C or COBOL compiler) and to binary optimizers (where the input is already compiled code). Further, the references to a contiguous storage area, often used in COBOL programs, may refer broadly to both compiler generated "temporary" storage for compiler created infrastructure purposes as well as non-temporary storage, which may be for user-defined/declared variables. The term "contiguous storage area" may be used herein to refer to storage areas whether used for temporary or non-temporary storage.

Processing proceeds to step S265, where split mod 365 splits the target contiguous storage area for dead store elimination. The target contiguous storage area is split into two portions. The two store elimination phases introduced in this disclosure include a first set of passes through a first portion of the contiguous storage area and a second set of passes through a second portion of the contiguous storage area. Splitting the overall contiguous storage area into two portions facilitates the two-phase process for efficiently eliminating intervals of dead store ranges. It should be noted, as described herein, that the first set of passes includes fewer passes than the second set of passes. The first set of passes may include only a single pass.

Processing proceeds to step S270, where first portion mod 370 executes a store elimination pass on the first portion of the target contiguous storage area. Only a few store elimination passes, if not just a single pass, are needed for the larger first portion of the contiguous storage area. The PERFORM-related stores are all storing four-byte program address locations so not every byte needs to be tracked. Instead, one bit per four bytes can be used. Similarly, if the address size for the program were instead all eight bytes, then only one bit per eight bytes would be needed. In either case, a single bit is sufficient for tracking, as these four-byte and eight-byte address sized slots would only ever be read or written as a complete four-byte or eight-byte unit.

Processing proceeds to step S275, where deadness sets mod 375 creates two deadness contribution sets for each control flow block to the second contiguous storage area portion. In the example in Table 1, the two deadness contribution sets are referred to as the GEN set and the KILL set. Each set is a set of ranges mapping bytes of the heavily reused computational store portion of the contiguous storage area. The GEN set is the set of ranges that are newly dead according to a given control flow block represented by the GEN and KILL set. The KILL set is the set of ranges that are no longer dead according to the control flow block.

As shown in the example in Table 1, intermediate representations in each basic block are processed in order. The writes to the computational store portion of the contiguous storage area are processed as contributions to the GEN set. Reads of the computational store portion of the contiguous storage area are processed as contributions to the KILL set. While processing the contribution sets, there is a focus on ensuring that the minimum set of ranges are created for each basic block by considering overlapping ranges and other cases where reduction of the number of ranges in each set is possible. One reason for this action is because the complexity of many of the set operations are based on how many ranges are in each set.

Processing proceeds to step S280, where dataflow sets mod 380 initializes two dataflow sets, IN and OUT sets, for each basic block of the control flow graph. The two dataflow sets represent the results of the dataflow. Since the analysis is backwards, the IN set represents the set of dead ranges at the end of the control flow block and the OUT set represents the set of dead ranges at the start of the control flow block. The two sets are initialized after all the intermediate representations in each block are processed to create GEN and KILL sets. The IN and OUT sets for each block are initialized to be a single range of the entire computational store portion of the contiguous storage area.

Processing proceeds to step S285, where analysis mod 385 performs deadness-range-based dataflow analysis. Instead of simple bitvectors for dataflow analysis where a bit maps to one or more bytes, the second phase of the disclosed dead store elimination process tracks and merges intervals of dead ranges. Otherwise, the focus would be on tracking every byte to perform dead store elimination.

The dataflow analysis proceeds with a first-in/first-out (FIFO) queue of basic blocks and begins by pushing the exit block on the stack. Each block is processed sequentially by first calculating its IN set using set intersection on each of the OUT sets of the successor blocks. Set intersection takes into account that the sets of ranges are sorted by offset to take O(N) time.

The OUT set of the same block is calculated by using the formula:

OUT=(IN−KILL)UGEN.

In cases where the OUT set changes, all the predecessors of the block are added to the FIFO queue. The deadness-range-based dataflow analysis continues until the FIFO queue is empty.

Processing ends at step S290, where dead store range mod 390 eliminates ranges of dead stores as intervals of ranges of the IN set for each basic block. In this example, the results of the deadness-range-based dataflow analysis are used by taking the IN set for each basic block. By cross referencing the list of stores in the basic block to the computational store portion of the contiguous storage area, stores that are in the set of dead ranges in the IN set are eliminated.

Some embodiments of the present invention can apply to a variety of environments and scenarios included high level source code compilers, binary translators/optimizers (including emulators, interpreters, virtual machines and other similar dynamic runtime environments that may include a binary translator/optimizer component). Binary translation/optimization may translate from one computer architecture to another one (e.g. IBM Z to x86) or it may translate between different levels of a common architecture (such as an old IBM Z to a newer IBM Z). (Note: the term(s) "Z," "IBM Z," and/or "X86" may be subject to trademark rights in various jurisdictions throughout the world and are used here only in reference to the products or services properly denominated by the marks to the extent that such trademark rights may exist.) A binary translator/optimizer may change the unit of compilation (e.g. from entire compiled source programs to some form of trace based compilation) and/or also apply more advanced optimizations to increase program efficiency and performance. This change in the unit of compilation may be combined, or not, with also changing the target architecture.

It should be noted that the unit of compilation/translation may take multiple forms including complete compiled programs and/or source code, but also in the form of a "trace" of instructions where a trace is a sequence of original machine instructions executed at runtime. This trace of instructions is tracked and collected by some component of an emulator/interpreter, or similar managed runtime environment or virtual machine, and then passed to the binary translator/optimizer for native code generation for the target computer architecture. A trace of instructions may be a single execution path through a single program, or it may cross traditional program boundaries (e.g., to other programs, or into system programs, or both) by following calls and branches.

Some embodiments of the present invention are directed to reducing the time and memory required by the binary optimizer to perform dead store elimination and related data flow analysis passes.

Some embodiments of the present invention are directed to the following three-pronged process in support of dead store elimination: (i) split the contiguous storage area; (ii) track deadness; and (iii) track intervals of dead ranges.

Split the Contiguous Storage Area

Splitting the contiguous storage area leverages information on the layout of this storage area that is gathered during initial analysis performed by a binary optimizer. The layout information is used to identify the part of this storage area most likely to be used, and reused, to hold temporary arithmetic results, such as the store locations from the storage-to-storage decimal instructions. Stores for this computational part of the contiguous storage area are critical to eliminate to enable the use of newer hardware facilities that are not storage-to-storage operations but can instead process their operands all, or in part, in machine registers leading to more efficient processing.

A key observation here is that in many real-world customer programs this critical part of the contiguous storage area is a small fraction (sometimes five percent or less) of the overall contiguous storage area size. Real-world customer programs and compiled modules are often large and contain many PERFORM statements (the primary COBOL control flow construct) such that the PERFORM infrastructure requires substantial amount of storage to store program location addresses.

While still important for code size reduction and shorter path length eliminating the PERFORM-related stores does not require many multiple store elimination passes for optimal store elimination. Because PERFORM-related stores include only four-byte program address locations, not every byte needs to be tracked (as opposed to arithmetic results where this per-byte tracking is needed for dead store effectiveness) but instead one bit per four bytes can be used. This reduced amount of data further reduces the time taken by the dataflow analysis.

Track Deadness

Instead of tracking live bytes, i.e. bytes of the contiguous storage area that may be read in the future, and removing the stores that are not live, tracking deadness, the inverse of liveness, operates to track the bytes that are definitely not read in the future. By tracking deadness, less information and data are processed by the dataflow pass. The reduced information and data processing is because deadness-based analysis is a backwards intersection analysis. Information about deadness propagates less globally because data about which part of the contiguous area is dead requires that the range of the storage area to be dead on all paths for the deadness information to be propagated upwards. When using deadness information, no deadness information would be propagated past unknown loads and calls because not being set in the deadness scheme means the data may be "live."

A liveness-based analysis would use backwards union analysis, where data can be live on any path. Binary optimizers typically have less precise information on the possible use of certain data areas, including the original contiguous storage area used by some load instructions, and especially by call instructions, present in the original program. The information for a binary optimizer is less precise, compared to source code compilation by a compiler, because binary optimizers work from the lower-level binary (e.g. compiled) representation of a program that cannot rely on source language rules and conventions. Therefore, on encountering these "unknown" loads and calls, a binary optimizer needs to be conservative and assume they could read the entire storage area. This results in many cases where the liveness information with bitvectors would have the entire bitvector being set. Bitvectors with many bits set both increase the storage requirements to maintain the bitvector, as well as making the various dataflow operations more expensive.

Track Intervals of Dead Ranges

Instead of using the conventional approach of simple bitvectors for dataflow analysis where a bit maps to one or more bytes, intervals of dead ranges are tracked and merged. Tracking these intervals results in less data to be processed by the dataflow analysis and less data means faster processing and lower memory requirements.

For example, if a storage area of 10,000 bytes were to be tracked, then using bitvectors would require 10,000 bits (about 1.2 kB) when mapping one byte to one bit. Conversely, when using ranges, the size of the data scales with the number of distinct ranges. If there are only two dead ranges, then only 16 bytes (down from 1.2 kB) of optimizer memory is required. In this example, for some embodiments of the present invention, 16 bytes is needed because each of the two dead ranges requires eight bytes of storage. The eight bytes is comprised of a four-byte offset (denoting the start of the dead range) and a four-byte length (indicating the length of the dead range starting from the start offset).

Another advantage of using dead ranges is that the corresponding data structure matches the natural locality of dead bytes in a block because programs will typically read and write parts of storage that are close together and are performed close together for a given program. For example, if "n" intermediate results need to be calculated before producing a result, then the "n" intermediate results will be naturally next to each other in memory and the instructions to operate on them will also be closely located.

According to some embodiments of the present invention, the logically split contiguous area is implemented by accessing information gathered during initial analysis done by a binary optimizer when forming the control flow graph of the original binary code. The initial analysis includes identifying where the slots for the PERFORM related infrastructure are located. Based on the storage area layout used by some COBOL compilers, it can be known that these PERFORM slots always end before the computational storage area begins. Therefore, conventional monolithic store elimination passes on the entire contiguous storage area are modified to take advantage of certain characteristics of this storage area. The store elimination passes are performed as two independent store elimination processes that, in combination, efficiently and effectively cover an entire contiguous storage area.

A first independent store elimination pass is performed on the PERFORM-related store portion. Only a small set of passes, such as one or two, is necessary to optimize this portion because few or no new optimization opportunities are exposed that would require many subsequent store elimination passes.

The second independent store elimination process may require a greater number of multiple passes than the first store elimination pass or set of passes. The second process is performed on the remaining portion of the contiguous storage area, the "computational" storage area. This range of storage includes the heavily reused computational temporary area that requires multiple store elimination to expose all optimization opportunities. The second process makes use of the second and third prongs of the three-pronged process described above in support of dead store elimination.

While tracking deadness and intervals of deadness via a deadness-range-based dataflow analysis, an effort is made to ensure that the minimum set of ranges is created per basic block of the control-flow graphs. So, for example, if there is an existing range in a set {a,b} that overlaps with a new range {c,d} then, the set {a,b} is removed and replaced with the set {a,d}. Similarly, processing is performed to handle other cases in which the number of ranges in a set can be reduced.

Having processed all the IR to create the GEN and KILL sets for each basic block, the two sets to be used in execution of the dataflow analysis are initialized, specifically, the IN and OUT sets of each basic block. The IN and OUT sets are initialized with each corresponding basic block being a single range for the entire contiguous computational store portion of the contiguous storage area. Processing proceeds with the actual dataflow analysis as follows: having a first-in/first-out (FIFO) queue of blocks, the process starts by pushing the exit block (a placeholder for the end of the program) onto the stack. The dataflow analysis processes each basic block by first calculating its IN set, which entails performing set intersection on each of its successors OUT sets. This set intersection process takes into account that the sets of ranges are sorted by offset to take O(N) time. The OUT set of the same basic block is calculated by using the formula:

$$OUT = (IN - KILL) \cup GEN.$$

Then, if the OUT set has changed, all the predecessors of the basic block are added to the queue. The dataflow continues until the queue is empty.

The results of the deadness-range-based dataflow analysis are used by taking the IN set for each basic block. Because the dataflow is backwards, the IN set includes the set of ranges of the storage area that are dead at the end of the block. By cross referencing the list of stores in the block to the storage area, stores that are in the set of dead ranges in the IN set are eliminated.

In conclusion, real-world implementation of some embodiments of the present invention as discussed in this Detailed Description were implemented with success as follows. The use of some of the above dataflow techniques resulted in reducing the time taken by the dead store optimization and dataflow analysis by 92% and the overall optimization time of the binary optimizer by 48%. Over a range of other inputs, the time taken by the dead store optimization and dataflow was reduced by between 48-90% and the overall optimization time of the binary optimizer by between 12-60%. Further, the new dataflow reduced the overall memory usage required by the binary optimizer itself by an average of about 39%.

Some embodiments of the present invention are directed to a method of removing stores from the contiguous storage area by splitting the sections of this storage area and using a deadness range-based dataflow analysis.

Some embodiments of the present invention are directed to leveraging the specific structure of the storage areas established by the original COBOL compiler, plus a method to make dead store elimination much more efficient by tracking intervals of deadness vs bits of liveness instead of using symbolic execution or exhaustive branch analysis. To clarify, the "original COBOL compiler" in the previous sentence is the one used to generate the compiled program that is the input to a binary optimizer implementing the present invention.

Some embodiments of the present invention are directed to removing stores throughout the program to the original contiguous storage area.

Some embodiments of the present invention are directed to efficiently eliminating dead stores using storage area splitting and deadness range-based dataflow using analysis done by a binary optimizer.

Some embodiments of the present invention are directed to a process for program optimization by elimination of dead stores. The process includes: (i) in response to accessing information gathered during initial analysis done by a binary optimizer when forming a control flow graph of original binary code of a program, identifying locations of storage for PERFORM related infrastructure; (ii) in a first unique store elimination pass, identifying stores to storage area locations up to an end of a last PERFORM slot; (iii) in a second unique store elimination pass for only stores after last PERFORM slot: (a) analyzing each control flow graph block for deadness, and (b) using an intermediate representation (IR) of the program to form a GEN set and to form a KILL set with each being a set of ranges mapping bytes of storage area to represent a contribution of each control flow graph block to the deadness of the storage area with a respective GEN set forming a set of ranges that are newly dead from a particular control flow block and a respective KILL set forming a set of ranges no longer dead from the particular control flow block; (iv) identifying writes to the storage area as contributions to the GEN set and identifying reads of the storage area as contributions to the KILL set; (v) creating a minimum set of ranges per block by reducing a number of ranges in each set when an existing range in a set overlaps with a new range removing set; (vi) in response to creating the GEN set and the KILL set for each block, initializing IN and OUT sets of each block with each of these to be a single range containing an entire storage area segment; (vii) executing a dataflow analysis using a first in first out queue of blocks by pushing an exit block representing a placeholder for an end of the program onto a stack; (viii) for each block calculating its IN set by performing set intersection on each of its successors OUT sets; (ix) calculating the OUT set of a same block using an expression OUT=(IN−KILL) U GEN; (x) in response to a determination the OUT set has changed, adding all predecessors of the block to the queue; (xi) in response to a determination the queue is empty, using results of the dataflow by taking the IN set for each block as the set of ranges of the storage area that are dead at the end of the block to cross reference a list of stores in the block to the storage area; and (xii) eliminating stores that are in the set of dead ranges in the IN set.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method for dead store elimination of a program, the method comprising:
   determining in which infrastructure slots the control flow related metadata is located in a contiguous storage area for compiler metadata;
   executing at least one store elimination pass on a first portion of the contiguous storage area ending at a last slot sequentially located last among the infrastructure slots for the control flow related metadata;
   creating two deadness contribution sets for each control flow block in a second portion of the contiguous storage area, the second portion being the remaining contiguous storage area after the last slot for the control flow related metadata;
   initializing two dataflow sets for each control flow block in the second portion of the contiguous storage area;
   executing at least one deadness-range-based dataflow analysis on the second portion to identify intervals of dead store ranges; and
   eliminating the identified intervals of dead store ranges of a program.

2. The computer-implemented method of claim 1, further comprising:
   processing intermediate representations of each control flow block with respect to the corresponding two deadness contribution sets,
   wherein:
   the two deadness contribution sets include a GEN set and a KILL set;
   the GEN set of each corresponding control flow block including writes to the second portion; and
   the KILL set of each corresponding control flow block including reads of the second portion.

3. The computer-implemented method of claim 2, wherein executing a deadness-range-based dataflow analysis includes:
   calculating the two dataflow sets including an IN set and an OUT set for each control flow block, the IN set being calculated using set intersection on each of the OUT sets of the successor control flow blocks, and the OUT set being calculated by the formula OUT=(IN−KILL) U GEN.

4. The computer-implemented method of claim 1, wherein the infrastructure slots for the control flow related metadata are determined according to analysis information gathered by a binary optimizer to form a control flow graph of original binary code for the program.

5. The computer-implemented method of claim 1, further comprising:
   splitting the contiguous storage area for compiler metadata into the first portion and the second portion by dividing the two portions at the last slot of the control flow related metadata, the first portion including the last slot.

6. The computer-implemented method of claim 1, wherein:
executing a deadness-range-based dataflow analysis continues until a first-in/first-out (FIFO) queue of control flow blocks is empty; and
eliminating the identified intervals of the dead store ranges of the program is performed responsive to the FIFO queue being empty.

7. A computer program product comprising a computer-readable storage medium having a set of instructions stored therein which, when executed by a processor, causes the processor to eliminate dead stores in a program by:
determining in which infrastructure slots the control flow related metadata is located in a contiguous storage area for compiler metadata;
executing at least one store elimination pass on a first portion of the contiguous storage area ending at a last slot sequentially located last among the infrastructure slots for the control flow related metadata;
creating two deadness contribution sets for each control flow block in a second portion of the contiguous storage area, the second portion being the remaining contiguous storage area after the last slot for the control flow related metadata;
initializing two dataflow sets for each control flow block in the second portion of the contiguous storage area;
executing at least one deadness-range-based dataflow analysis on the second portion to identify intervals of dead store ranges; and
eliminating the identified intervals of dead store ranges of a program.

8. The computer program product of claim 7, further causing the processor to eliminate dead stores by:
processing intermediate representations of each control flow block with respect to the corresponding two deadness contribution sets,
wherein:
the two deadness contribution sets include a GEN set and a KILL set;
the GEN set of each corresponding control flow block including writes to the second portion; and
the KILL set of each corresponding control flow block including reads of the second portion.

9. The computer program product of claim 8, wherein executing a deadness-range-based dataflow analysis includes:
calculating the two dataflow sets including an IN set and an OUT set for each control flow block, the IN set being calculated using set intersection on each of the OUT sets of the successor control flow blocks, and the OUT set being calculated by the formula OUT=(IN−KILL) U GEN.

10. The computer program product of claim 7, wherein the infrastructure slots for the control flow related metadata are determined according to analysis information gathered by a binary optimizer to form a control flow graph of original binary code for the program.

11. The computer program product of claim 7, further causing the processor to eliminate dead stores by:
splitting the contiguous storage area for compiler metadata into the first portion and the second portion by dividing the two portions at the last slot of the control flow related metadata, the first portion including the last slot.

12. The computer program product of claim 7, wherein:
executing a deadness-range-based dataflow analysis continues until a first-in/first-out (FIFO) queue of control flow blocks is empty; and
eliminating the identified intervals of the dead store ranges of the program is performed responsive to the FIFO queue being empty.

13. A computer system for dead store elimination of a program, the computer system comprising:
a processor set; and
a computer readable storage medium;
wherein:
the processor set is structured, located, connected, and/or programmed to run program instructions stored on the computer readable storage medium; and
the program instructions which, when executed by the processor set, cause the processor set to eliminate dead stores in a program by:
determining in which infrastructure slots the control flow related metadata is located in a contiguous storage area for compiler metadata;
executing at least one store elimination pass on a first portion of the contiguous storage area ending at a last slot sequentially located last among the infrastructure slots for the control flow related metadata;
creating two deadness contribution sets for each control flow block in a second portion of the contiguous storage area, the second portion being the remaining contiguous storage area after the last slot for the control flow related metadata;
initializing two dataflow sets for each control flow block in the second portion of the contiguous storage area;
executing at least one deadness-range-based dataflow analysis on the second portion to identify intervals of dead store ranges; and
eliminating the identified intervals of dead store ranges of a program.

14. The computer system of claim 13, further causing the processor to eliminate dead stores by:
processing intermediate representations of each control flow block with respect to the corresponding two deadness contribution sets,
wherein:
the two deadness contribution sets include a GEN set and a KILL set;
the GEN set of each corresponding control flow block including writes to the second portion; and
the KILL set of each corresponding control flow block including reads of the second portion.

15. The computer system of claim 14, wherein executing a deadness-range-based dataflow analysis includes:
calculating the two dataflow sets including an IN set and an OUT set for each control flow block, the IN set being calculated using set intersection on each of the OUT sets of the successor control flow blocks, and the OUT set being calculated by the formula OUT=(IN−KILL) U GEN.

16. The computer system of claim 13, wherein the infrastructure slots of the control flow related metadata are determined according to analysis information gathered by a binary optimizer to form a control flow graph of original binary code for the program.

17. The computer system of claim 13, further causing the processor to eliminate dead stores by:
splitting the contiguous storage area for compiler metadata into the first portion and the second portion by dividing the two portions at the last slot of the control flow related metadata, the first portion including the last slot.

18. The computer system of claim 13, wherein:

executing a deadness-range-based dataflow analysis continues until a first-in/first-out (FIFO) queue of control flow blocks is empty; and eliminating the identified intervals of the dead store ranges of the program is performed responsive to the FIFO queue being empty.

* * * * *